(12) United States Patent
Bækgård et al.

(10) Patent No.: US 9,092,997 B2
(45) Date of Patent: Jul. 28, 2015

(54) DENTAL MODEL

(75) Inventors: Per Bækgård, Hørsholm (DK); Jørn Trustrup, Hvidovre (DK)

(73) Assignee: APROXI ApS, Herlev (DK)

( * ) Notice: Subject to any disclaimer, the term of this patent is extended or adjusted under 35 U.S.C. 154(b) by 31 days.

(21) Appl. No.: 13/580,926

(22) PCT Filed: Feb. 25, 2011

(86) PCT No.: PCT/EP2011/052830
§ 371 (c)(1),
(2), (4) Date: Nov. 7, 2012

(87) PCT Pub. No.: WO2011/104351
PCT Pub. Date: Sep. 1, 2011

(65) Prior Publication Data
US 2013/0059278 A1    Mar. 7, 2013

Related U.S. Application Data

(60) Provisional application No. 61/282,524, filed on Feb. 25, 2010.

(30) Foreign Application Priority Data

Feb. 25, 2010   (DK) ................................ 2010 70070

(51) Int. Cl.
*G09B 23/32* (2006.01)
*G09B 23/30* (2006.01)
*G09B 23/28* (2006.01)

(52) U.S. Cl.
CPC .................... *G09B 23/283* (2013.01)

(58) Field of Classification Search
CPC ...................................................... G09B 23/283
USPC ................... 434/263; 433/213, 214
See application file for complete search history.

(56) References Cited

U.S. PATENT DOCUMENTS 1,045,920 A    12/1912  Wenker
1,387,540 A    8/1921   Eklof
1,711,947 A    5/1929   Ingwersen
(Continued)

FOREIGN PATENT DOCUMENTS

WO    WO-2007/084768 A1    7/2007
WO    WO 2007084768    *    7/2007

OTHER PUBLICATIONS

International Search Report PCT/ISA/210.
(Continued)

*Primary Examiner* — Robert J Utama
*Assistant Examiner* — Jennifer L Fassett
(74) *Attorney, Agent, or Firm* — Harness, Dickey & Pierce, P.L.C.

(57) ABSTRACT

The invention provides a dental model with an artificial jawbone with cavities, at least two artificial teeth, and interfaces each connecting a corresponding tooth to the jawbone such that it extends upwards from a corresponding cavity. To enable movement of the teeth relative to the jawbone and relative to the other teeth, the teeth are connected to the jawbone via interfaces which are more elastically deformable than the teeth and jawbone. In this way, a realistic dental model can be made in a very simple and cost efficient manner, e.g. in an SLS process. The invention further provides a method of making the dental model.

19 Claims, 4 Drawing Sheets

(56) References Cited

U.S. PATENT DOCUMENTS

| | | | |
|---|---|---|---|
| 1,822,043 A | 9/1931 | Köhler | |
| 1,948,059 A | 2/1934 | Baugh | |
| 2,005,114 A | 6/1935 | Spitzer et al. | |
| 2,266,434 A | 12/1941 | Morrison | |
| 2,750,670 A * | 6/1956 | Vigg | 434/264 |
| 3,226,827 A | 1/1966 | Spalten | |
| 3,458,936 A | 8/1969 | Schulz et al. | |
| 5,120,229 A * | 6/1992 | Moore et al. | 434/263 |
| 5,511,275 A * | 4/1996 | Volpenhein et al. | 15/167.1 |
| 6,257,895 B1 * | 7/2001 | Oestreich | 434/274 |
| 6,969,258 B1 | 11/2005 | Shaygan | |
| 7,056,115 B2 * | 6/2006 | Phan et al. | 433/24 |
| 7,544,061 B2 * | 6/2009 | Poitras | 434/263 |
| 2003/0124492 A1 * | 7/2003 | Perot | 433/213 |

OTHER PUBLICATIONS

Written Opinion PCT/ISA/237.

\* cited by examiner

A-A

DENTAL MODEL

PRIORITY STATEMENT

This application is a national phase under 35 U.S.C. §371 of PCT International Application No. PCT/EP2011/052830 which has an International filing date of 25 Feb. 2011, which claims priority to Danish Application No. PA 2010 70070, filed on 25 Feb. 2010 and U.S. Provisional Application No. 61/282,524, filed on 25 Feb. 2010.

The invention relates to a dental model with a jawbone and teeth arranged in cavities of the jawbone. Particularly, the invention relates to a dental model to be used in dentistry and which therefore should imitate the characteristics of real teeth and jawbone. To allow realistic surgery training with possible destruction of the model, the dental model of the invention may facilitate disposable use of dental models, e.g. dental models which are used only once and subsequently disposed.

BACKGROUND OF THE INVENTION

The invention is in the field of dentistry, especially in the teaching of dentistry and for demonstration purpose. Dental models with artificial teeth are known e.g. from U.S. Pat. No. 2,005,114, U.S. Pat. No. 3,458,936, U.S. Pat. No. 2,750,670, U.S. Pat. No. 3,226,827, U.S. Pat. No. 1,822,043, U.S. Pat. No. 1,948,059, U.S. Pat. No. 1,387,540, U.S. Pat. No. 1,711,947, U.S. Pat. No. 2,266,434, and U.S. Pat. No. 1,045,920.

Traditionally, dental models are made in several pieces which are detachably joined. Often, each tooth is joined individually to the jawbone such that they can be replaced individually. Regardless the benefits provided thereby, the complexity and cost of manufacturing and maintaining the dental model increases.

There is a need for a simple and yet realistic dental model.

DESCRIPTION OF THE INVENTION

It is an object of embodiments of the invention to provide a dental model which is realistic and yet simple such that the manufacturing costs can be lowered and the model can be considered as a disposable item.

In a first aspect, the invention provides a dental model comprising an artificial jawbone with cavities, at least two artificial teeth, and interfaces each connecting a corresponding tooth to the jawbone such that it extends upwards from a corresponding cavity, wherein each interface is more elastically deformable than the corresponding tooth and the jawbone such that each tooth can move relative to the other teeth and relative to the jawbone by elastic deformation of the corresponding interface.

Since the jawbone and the tooth are less elastically deformable than the interface, a durable model can be made from relatively inexpensive materials when compared with latex and soft rubber materials typically used for making dental models. Due to the interface, the dental model may, in spite of its simplicity, become realistic with respect to the flexibility of each tooth to be moved relative to the other teeth and the jawbone.

Since that elasticity which makes each tooth movable is derived via the interface between the tooth and jawbone, the entire dental model may be made in one and the same material and in particular, the model may be made in one piece.

The interface could be made from the same material as the jawbone and the tooth as long as the size and shape of the interface provides the mentioned increased elastic flexibility when compared to that of the jawbone and tooth.

Accordingly, the invention provides a realistic, yet simple, dental model which allows realistic surgery training in dentistry.

Since each tooth extends upwards from a corresponding cavity, there is an overlap between each tooth and the walls of the cavity. In particular, each tooth may be attached via the corresponding interface at a bottom portion of the corresponding cavity, and from this point the tooth extends upwardly without being in contact with the jawbone except at the bottom via the interface.

By the specification that each interface is more elastically deformable than the corresponding tooth and the jawbone is herein meant that if a specific pressure is applied to a tooth while the jawbone is in a fixed position, the tooth may move relative to the jawbone and relative to the other teeth by deformation of the interface without deformation of the jawbone and without deformation of the tooth itself.

By "jawbone" is herein meant an element to which all the teeth are joined. The jawbone according to the invention could have a shape corresponding to that of the gums of a human being or it could have any other shape which may be suitable for dental training purposes.

By elastically deformable is herein meant that the interface can deform and revert to its previous shape when the applied pressure is removed such that the tooth in question reverts to its original position when the pressure is relieved. The dental model may comprise an interface or several interfaces providing the elastic deformation whereby at least one tooth can move relative to the jawbone and other teeth.

The dental model may be designed such that the elastic deformation is symmetric which herein means that the same pressure when applied in directions perpendicular to the upwards direction results in the same extend of deformation and thus movement of the corresponding tooth. The dental model may also be made with asymmetric elastic deformation e.g. such that movement of a tooth in a direction towards an adjacent tooth becomes easier than movement of that tooth in other directions.

In one embodiment, the jawbone and the tooth are not elastically deformable at pressures which deform the interface visually. I.e. when movement of the tooth can be detected visually, e.g. movements of 0.2-1 mm, neither the tooth, nor the jawbone are deformed.

In one embodiment, the tooth and jawbone may not deform at pressures which are sufficient for moving the tooth until it comes in contact with the inner surface of the corresponding cavity in which it is located.

As an example, the model could be made in a moulding process, e.g. by pressure moulding etc, e.g. from a polymer material or metal. As it will be mentioned later, the model may also be made in one piece by use of an additive manufacturing technique.

During filling of teeth, it is known to provide a band which is adapted to encircle a tooth being filled to support weak walls of the tooth following drilling against the outward forces which are applied during the compression of the filling material into the cavity drilled in a tooth. Such bands are sometimes referred to as "matrix bands".

To facilitate simulated tooth fillings by use of matrix bands, the dental model according to the invention may be provided with a space between the jawbone and the teeth such that the matrix band can be pressed into this space in a realistic manner corresponding to the way the matrix band in a real dental surgery is often pressed down in gingival sulcus or further into a space between the gum and the tooth.

To provide this space, at least one and typically all teeth may be shaped and sized relative to the corresponding cavity such that a gap is formed between an outer surface of the tooth and an inner surface of the corresponding cavity. In this embodiment, the teeth can be moved sideways in the cavity within the limits set by the gap—i.e. until the outer surface of a tooth comes in contact with the inner surface of the cavity.

The interface may comprise a bridge portion bridging the above mentioned gap between the tooth and the jawbone. In one embodiment, the jawbone and each tooth are connected at the bottom of the tooth by one, two, three or more bridges e.g. constituted by oblong elements joining the jawbone and the tooth.

Herein, the upwards direction is the direction in which the tooth extends up from the cavity of the jawbone. The upwards direction is given individually for each tooth by a geometric centreline through the centre of the tooth from its root to its crown.

The bridge portion may e.g. be constituted by one or more elements, e.g. elongated pin-shaped elements, e.g. elements extending in a direction being transverse to the upwards direction. In one embodiment, the bridge portion(s) extend(s) perpendicular to the upwards direction.

A lower surface of the dental model may be formed by the jawbone, and to facilitate location of the dental model on a table etc, the lower surface may be flat.

The dental model may comprise a low number of teeth to keep the production costs low. In particular, it is relevant to provide a dental model with one tooth surrounded on both sides with an adjacent tooth or to provide a model with at least two adjacent teeth. The dental model may therefore be made with less than 4 or even less than 3 teeth.

In a second aspect, the invention provides a method of making a dental model comprising modelling an artificial jawbone with cavities, at least two artificial teeth, and interfaces connecting each tooth to a corresponding cavity.

According to the method, the dental model could be made such that movement of at least one tooth relative to the jawbone and relative to the other teeth becomes possible by elastic deformation of the interface.

In particular, the second aspect provides a method by which the dental model is made in one piece.

The interfaces could be made more elastically deformable either by selecting a different and more elastically deformable material for the interface than for the teeth and jawbone, or it could be made more elastically deformable by selecting a size and shape of the interface by which it becomes elastically deformable.

The dental model could be made in metal or plastic. In particular, the model could be made by use of a polymer material, e.g. by use of an additive manufacturing technique such as selective laser sintering (SLS) stereolithography (SLA) process.

In a third aspect, the invention provides a training method by which a tooth filling is carried out on a dental model according to the first aspect of the invention by use of a matrix band.

DESCRIPTION OF EMBODIMENTS

Examples of the invention will now be described with reference to the drawings in which FIG. 1 illustrates a perspective view of a dental model according to the invention;

FIG. 2 illustrates a top view of the dental model;

FIG. 3 a cross-section of the dental model along section A-A in FIG. 2;

It should be understood that the detailed description and specific examples, while indicating embodiments of the invention, are given by way of illustration only, since various changes and modifications within the spirit and scope of the invention will become apparent to those skilled in the art from this detailed description.

Figure 1:
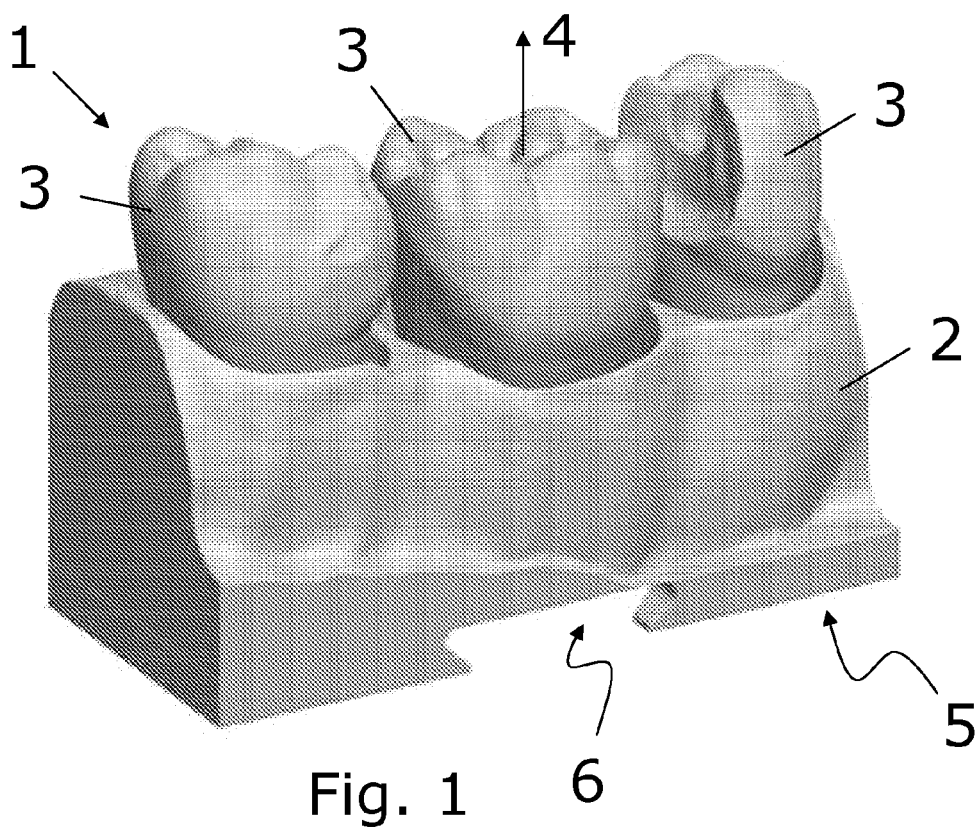

As illustrated in FIG. 1, the dental model 1 comprises an artificial jawbone 2 and artificial teeth 3 extending in an upwards direction indicated by the arrow 4 from a cavity in the jawbone. The dental model has a lower surface 5 with a fixing-structure 6 by which the dental model can be attached to a stand etc.

Figure 2:
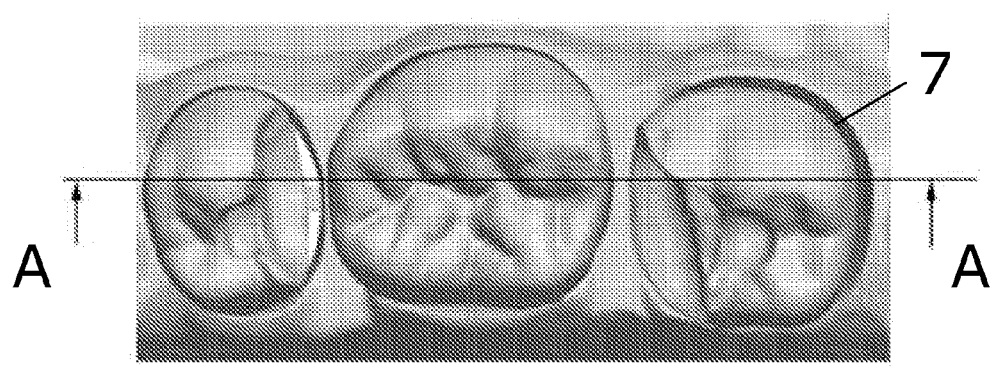

FIG. 2 illustrates the dental model seen from above. In this view, it is illustrated that the teeth 3 are located in cavities in the jawbone, and that they are shaped and sized relative to the cavities such that a gap 7 is formed around each tooth between an outer surface of the tooth and an inner surface of the corresponding cavity in the jawbone.

Figure 3:
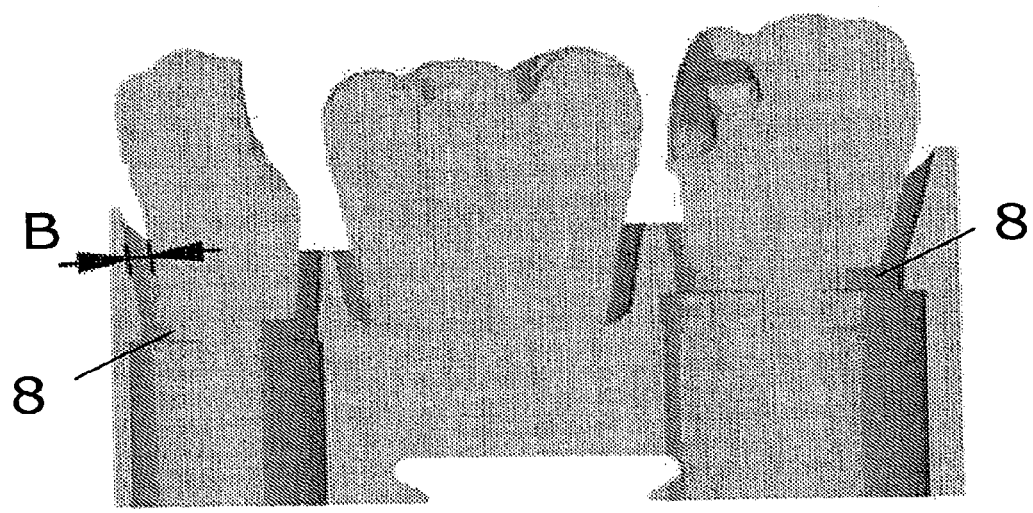

The cavities 8 are more clearly shown in FIG. 3 which illustrates a cross section along line A-A in FIG. 2. In this view, the gap is indicated with B. The gap may e.g. be in the size of 0.5 to 3 mm such as between 0.6 and 1.2 mm.

Figure 4:
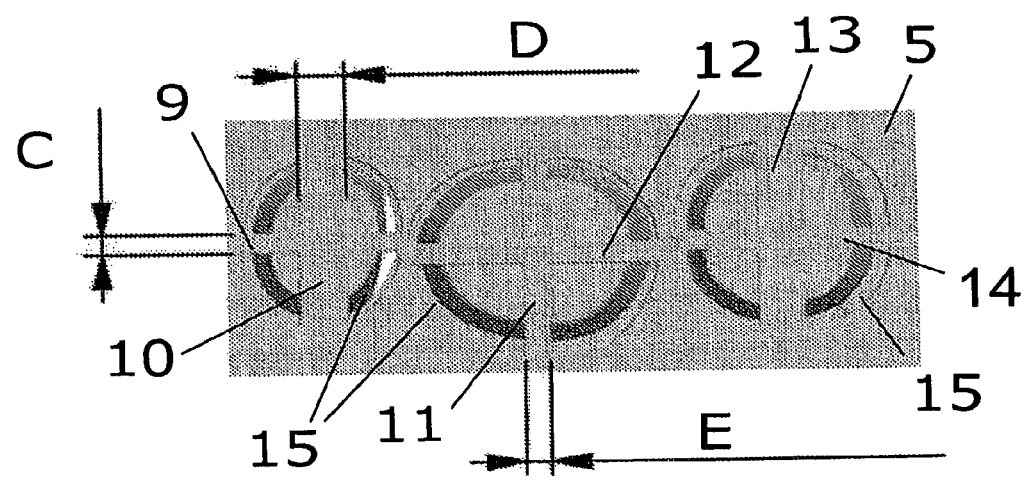
FIG. 4 illustrates a bottom view of the dental model.

FIG. 4 illustrates the dental model seen from below the lower surface 5 which is flat such that the dental model can be rested on a table. Additionally, the dental model comprises the fixing structure 6 illustrated most clearly in FIG. 1 and by which the dental model can be fixed to a table or stand.

In FIG. 4, the interfaces 9-14 are visible. In the illustrated embodiment, the interfaces are constituted by bridge portions bridging the gaps 15 between the teeth and the jawbone. The bridge portions form elongated elements extending in a direction being transverse to the upwards direction indicated in FIG. 1 by the arrow 4.

The width of the bridge portions are indicated by C, D, and E, respectively. The width may e.g. be between 0.5-10 mm, such as between 1 and 7 mm or between 2-5 mm. By varying the number of bridges, the dimension of the bridges, and/or the direction of the bridges the elastic deformation may become more or less asymmetric e.g. to facilitate movement of the teeth in specific directions and reduce movement in other directions. Particularly, it may be relevant to provide movement sideways in a direction from one tooth to an adjacent tooth.

Due to the elongated shape of the bridge portions, the interfaces 9-14 become more elastically deformable than the teeth and the jawbone. The higher elasticity of the interfaces are therefore obtainable even though identical materials are selected for the entire dental model, and the dental model may therefore easily be made in one piece, e.g. in a moulding process or by use of a material additive manufacturing technique such as SLS or SLA.

Since the bridge portions are elastically deformable and connect the teeth with the jawbone, each tooth can move relative to the other teeth and relative to the jawbone by elastic deformation of the corresponding interface.

Figure 5:
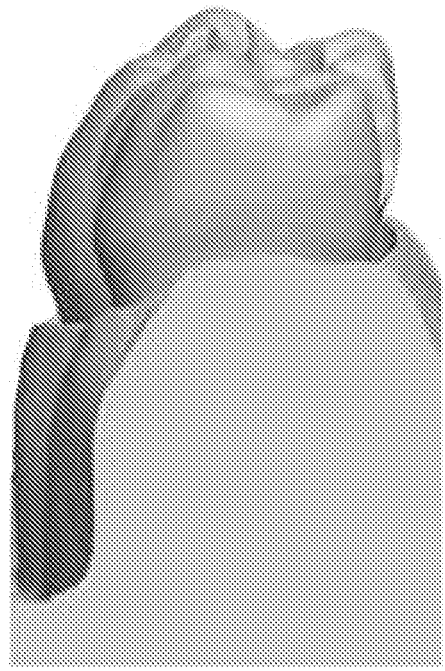
FIG. 5 illustrates a side view of the dental model.
Figure 6:
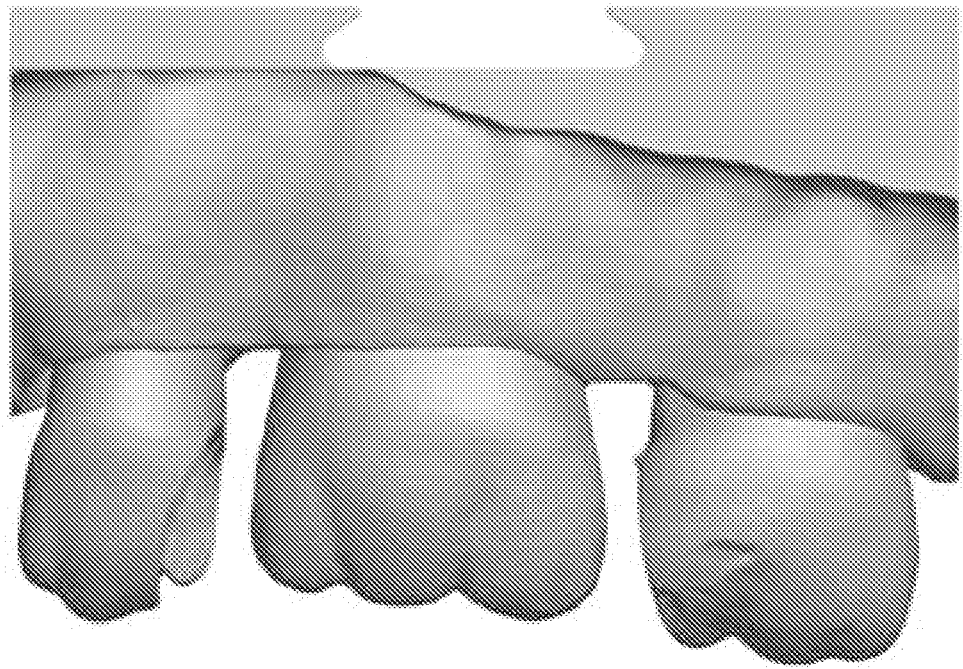
FIG. 6 illustrates a top view of the dental model.

FIGS. 5-6 illustrate further views of the dental model. The illustrated embodiment is made in one piece in an SLS process.

The dental model illustrated in FIGS. 1-6 comprises 3 teeth which number is sufficient for training purposes where one tooth is moved relative to the other teeth e.g. by use of a wedge which is wedged between two adjacent teeth. This may e.g. allow realistic training with matrices etc.

Figure 7:
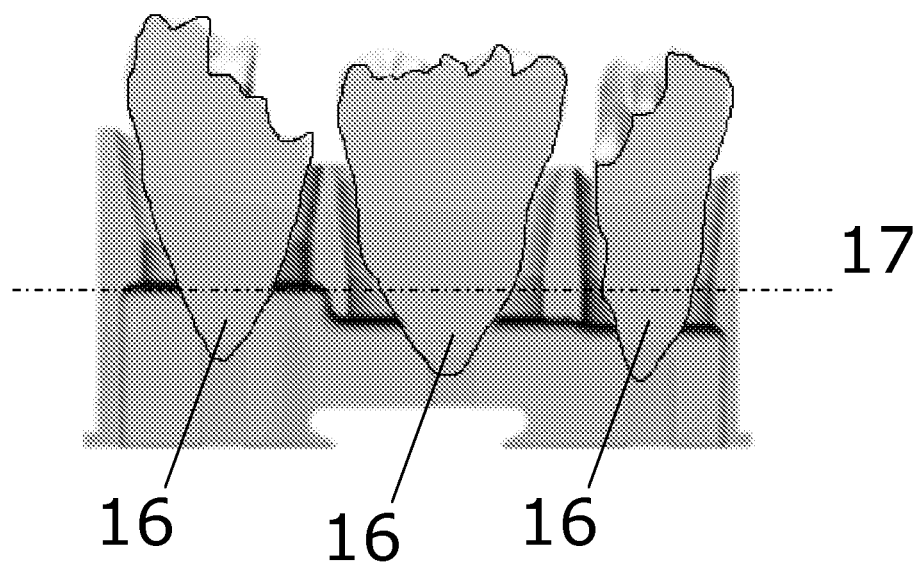
FIG. 7 illustrates in a view similar to that of FIG. 3, i.e. a cross section along line A-A in FIG. 2.

FIG. 7 illustrates in a view similar to that of FIG. 3, i.e. a cross section along line A-A in FIG. 2. In this embodiment, the teeth 3 terminates downwardly in a conically shaped bottom 16 below the dotted line 17 which is drawn for illustration only. The conically shaped bottom 16 enhances the natural-like flexing of the teeth relative to the bone.

The invention claimed is:

1. A dental model comprising:
   an artificial jawbone with cavities;
   at least two artificial teeth; and
   interfaces each connecting a corresponding tooth to the jawbone such that the corresponding tooth extends upwards from a corresponding cavity, wherein each interface is more elastically deformable than the corresponding tooth and the jawbone such that each tooth can move relative to the other teeth and relative to the jawbone by elastic deformation of the corresponding interface, and wherein the jawbone, the teeth and the interfaces are made in one piece by moulding or by use of an additive manufacturing technique.

2. A dental model according to claim 1, wherein the at least two teeth is three teeth.

3. A dental model according to claim 1, wherein at least one of the teeth terminates downwardly in a conically shaped bottom.

4. A dental model according to claim 1, wherein the artificial jawbone, the at least two artificial teeth, and the interfaces are formed of a same material.

5. A method according to claim 4, wherein the same material is a polymer material.

6. A dental model according to claim 1, wherein at least one of the teeth is shaped and sized relative to the corresponding cavity such that a gap is formed between an outer surface of the tooth and an inner surface of the corresponding cavity.

7. A dental model according to claim 6, wherein a lower surface of the jawbone comprises a fixing structure facilitating solid fixation of the dental model to a stand.

8. A dental model according to claim 6, wherein each interface comprises a bridge portion bridging the gap.

9. A dental model according to claim 8, wherein the bridge portion comprises a number of elongated pin-shaped elements extending between the jawbone and the tooth in the direction that is transverse to the upwards direction.

10. A dental model according to claim 8, wherein the bridge portion extends in a direction that is transverse to the upwards direction.

11. A dental model according to claim 1, wherein each interface is an elongated element that extends between opposite sides of a corresponding tooth.

12. A dental model comprising:
    an artificial jawbone with cavities;
    at least two artificial teeth; and
    at least one interface connecting a corresponding tooth to the jawbone, the at least one interface including a first elongated element extending between opposite sides of the corresponding tooth within a corresponding cavity, the at least one interface being more elastically deformable than the corresponding tooth and the jawbone such that each tooth can move relative to the other teeth and relative to the jawbone by elastic deformation of the at least one interface,
    wherein the at least one interface includes a second elongated element extending between opposite sides of the corresponding tooth, the second elongated element extending in a direction that is perpendicular to the first elongated element such that the first elongated element and the second elongated element intersect at a center portion of the corresponding tooth.

13. A dental model according to claim 12, wherein the first elongated element has a width between 0.5 mm and 10 mm.

14. A dental model according to claim 12, wherein the each of the first and second elongated elements has a width between 0.5 mm and 10 mm.

15. A dental model comprising:
    an artificial jawbone with cavities;
    at least two artificial teeth; and
    at least one interface connecting a corresponding tooth to the jawbone, the at least one interface including a first elongated element extending between opposite sides of the corresponding tooth within a corresponding cavity, the at least one interface being more elastically deformable than the corresponding tooth and the jawbone such that each tooth can move relative to the other teeth and relative to the jawbone by elastic deformation of the at least one interface,
    wherein the artificial jawbone, the at least two artificial teeth, and the at least one interface are integrally formed of a same material.

16. A method of making a dental model comprising:
    forming an artificial jawbone with cavities, at least two artificial teeth, and interfaces connecting each tooth to a corresponding cavity, wherein each interface is more elastically deformable than the corresponding tooth and the jawbone such that each tooth can move relative to the other teeth and relative to the jawbone by elastic deformation of the corresponding interface, and wherein the forming forms the artificial jawbone, the at least two artificial teeth, and the interfaces in one piece.

17. A method according to claim 16, wherein the forming is a moulding technique.

18. A method according to claim 16, wherein the forming is an additive manufacturing technique.

19. A method according to claim 18, wherein the additive manufacturing technique is selected from a group consisting of: selective laser sintering (SLS), stereolithography (SLA), Fused Deposition Modeling (FDM), Electron Beam Melting (EBM), 3D Printing (3DP), and 3D Ceramic Printing.

* * * * *